United States Patent
Mao

[19]

[11] Patent Number: 6,154,654

[45] Date of Patent: Nov. 28, 2000

[54] SYSTEM AND METHOD FOR FREQUENCY REUSE IN A FOUR CELL PLAN

[75] Inventor: Tom Mao, Beijing, China

[73] Assignee: Ericsson Inc., Research Triangle Park, N.C.

[21] Appl. No.: 09/074,253

[22] Filed: May 7, 1998

[51] Int. Cl.[7] .............................. H04Q 7/20; H04Q 7/36
[52] U.S. Cl. ................ 455/446; 455/447; 455/449; 455/450
[58] Field of Search .................. 455/446, 447, 455/450, 449

[56] References Cited

U.S. PATENT DOCUMENTS

| | | | |
|---|---|---|---|
| 5,247,699 | 9/1993 | Hartman | 455/33.1 |
| 5,365,571 | 11/1994 | Rha et al. | 455/446 |
| 5,708,968 | 1/1998 | Suzuki | 455/62 |
| 5,734,983 | 3/1998 | Faruque | 455/450 |
| 5,924,037 | 7/1999 | Mao | 455/447 |
| 6,002,935 | 12/1999 | Wang | 455/447 |

Primary Examiner—Daniel S. Hunter
Assistant Examiner—Alan T. Gantt
Attorney, Agent, or Firm—Jenkens & Gilchrist, P.C.

[57] ABSTRACT

A telecommunications system and method for a frequency re-use plan is disclosed which reduces the adjacent channel interference between cells, while maintaining good co-channel interference in a four cell frequency reuse plan with a center-excited three sector directional pattern. This can be accomplished by structuring the four cell frequency reuse plan such that no adjacent cells use adjacent channels. As a result, the adjacent channel interference can be minimized, the radio coverage can be extended and in-building penetration can be improved.

18 Claims, 3 Drawing Sheets

SYSTEM AND METHOD FOR FREQUENCY REUSE IN A FOUR CELL PLAN

BACKGROUND OF THE PRESENT INVENTION

1. Field of the Invention

The present invention relates generally to telecommunications systems and methods for allocating frequencies among cell clusters, and specifically to reducing the adjacent interference between cells in a four cell frequency reuse plan.

2. Background and Objects of the Present Invention

Cellular telecommunications is one of the fastest growing and most demanding telecommunications applications ever. Today it represents a large and continuously increasing percentage of all new telephone subscriptions around the world. Cellular networks have evolved into two different networks. The European cellular network uses the Global System for Mobile Communication (GSM) digital mobile cellular radio system. In the United States, cellular networks are still primarily analog, but many North American cellular networks have begun deploying SS7 to support access of remote databases. European cellular networks have always relied on SS7 for their signaling requirements. However, GSM is currently operated in North America in a newly reserved frequency band in the 1900 MHZ range. The revised GSM standard is also known as Personal Communication Services 1900 or PCS 1900. FIG. 1 illustrates the typical components of a GSM/PCS 1900 wireless communications system.

The GSM/PCS 1900 wireless communications system is located within a geographical area serviced by a single provider, hereinafter referred to as the Public Land Mobile Network (PLMN) 10. The basic components of the wireless communications system 10 are a Base Station System (BSS) 25, a Mobile Switching Center (MSC) 14 and connected Visitor Location Register (VLR) 16 and a Mobile Station (MS) 20. At least one BSS 25 is deployed within the PLMN 10. The BSS 25 acts as an interface between the MSC 14 and a plurality of MSs 20. The MS 20 may be a mobile wireless telephone, a pager or other equipment.

The MSC/VLR areas 12 include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12, in turn, is divided into a number of cells 22.

The BSS 25 includes a Base Transceiver Station (BTS) 24 and a Base Station Controller (BSC) 23. At least one BTS 24 operates as a transceiver for transmitting and receiving data and control messages to and from the MS 20 over the air interface within the cell 22. Also connected to the MSC 14 is a Home Location Register (HLR) 26. The HLR 26 is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MSs 20 currently located within the MSC/VLR area 12. If a MS 20 roams into a new MSC/VLR area 12, the VLR 16 connected to that MSC 14 will request data about that Mobile Station (terminal) 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Each service provider has a specified number of frequencies which can be used within the PLMN service area 10 assigned to the service provider. These frequencies are divided up among each of the cells 22. Due to the large number of cells 22 and small number of allowed frequencies, frequency re-use patterns are typically used by service providers to support cellular service for all customers within the PLMN service area 10.

As shown in FIG. 2 of the drawings, frequency re-use patterns are cell-based structures 240 by which the frequency channels within a cellular system 205 are assigned. The most basic unit of any frequency re-use pattern is the cell 200. Each cell 200 in a frequency re-use pattern is assigned a number of frequency channels. A group of cells 200 associated together are referred to as a cluster 240, indicated in FIG. 2 by the bold outlines. A cluster 240 contains all of the frequency channels available to a particular cellular system 205. Groups of clusters 240 are then used to provide cellular coverage over a specific area for a cellular system 205. The association of all frequency channels within a single cluster 240 enables the re-use of the frequency channels throughout the cellular system 205.

The particular cell planning structure illustrated in FIG. 2 is a center-excited, sectorized, four cell cluster 240, in which each cluster 240 consists of four cells 200, each of which are further divided into three sectors 210, 220 and 230. Each cell 200 within each cluster 240 is assigned a particular frequency group, which is divided into three sub-frequency groups for each of the three sectors 210, 220 and 230, respectively.

Each cell 200 contains a single antenna site (base station) 250 located substantially at the center of the cell 200. Each base station 240 has six antennas (not shown), two for each sector 210, 220, and 230. One antenna in each sector 210, 220, and 230 sends messages to mobile terminals within the sector 210, 220 and 230, while the other antenna in each sector 210, 220 and 230 receives messages from mobile terminals within the sector 210, 220 and 230. Both antennas in each sector 210, 220, and 230 point along the same direction, e.g., 30, 150, and 270 degrees from north for each of the three sectors 210, 220 and 230 respectively. The direction of the antennas is hereinafter referred to an antenna-pointing azimuth 215, which is represented by an arrow. The antenna-pointing azimuths 215 for each sector 210, 220 or 230 in a cell 200 are separated by 120 degrees.

The clusters 240 are structured and frequencies within the clusters 240 are assigned to increase the re-use distance and to limit co-channel and adjacent channel interferences. Co-channel interference consists of interference caused between uses of the same frequency within two different cell clusters 240. Adjacent channel interference is caused by interference between adjacent cells 200 and frequency channels within the same cluster 240 or within two different clusters 240. In order to reduce interference within the cellular system 205, both co-channel and adjacent channel interference must be minimized. Competing with these requirements is the need for increased system capacity. In general, the smaller the number of cells 200 used in a cluster 240 within a cellular system 205, the higher the capacity of the system and the lower the co-channel re-use distance. A smaller co-channel re-use distance, of course, increases co-channel interference.

In conventional frequency re-use patterns, such as the four cell plan shown in FIG. 2, it has been found that it is not possible to completely avoid allocating adjacent channels to adjacent cells, especially in the corner areas of the sector. A typical channel assignment for the four cell frequency reuse shown in FIG. 2 is illustrated in Table 1 hereinbelow.

TABLE 1

| | Frequency Channel Group | | | | | | | | | | | |
|---|---|---|---|---|---|---|---|---|---|---|---|---|
| | a1 | b1 | c1 | d1 | a2 | b2 | c2 | d2 | a3 | b3 | c3 | d3 |
| Channel | 1 | 2 | 3 | 4 | 5 | 6 | 7 | 8 | 9 | 10 | 11 | 12 |
| Number | 13 | 14 | 15 | 16 | 17 | 18 | 19 | 20 | 21 | 22 | 23 | 24 |
| | 25 | 26 | 27 | 28 | 29 | 30 | 31 | 32 | 33 | 34 | 35 | 36 |

As can be seen in the frequency assignments for a typical four cell frequency reuse plan given in Table 1 above, there are various cell corners where adjacent cells are allocated with adjacent channels, e.g., a1 and b1, b1 and c1, etc. For example, adjacent channels c3 and d3 between two adjacent cells share a common corner, illustrated by the point labeled 260. Similar corners with adjacent channels can be found throughout the frequency reuse plan of FIG. 2. Therefore, tight handover margins may be required in these regions to overcome the potential adjacent channel interference.

It is, therefore, an object of the invention to enhance channel capacity, improve the co-channel interference and substantially eliminate adjacent channel interference problems in a four cell frequency reuse plan.

SUMMARY OF THE INVENTION

The present invention is directed to telecommunications systems and methods for reducing the adjacent channel interference, while improving the co-channel interference in a four cell frequency reuse plan with a center-excited three sector directional pattern. This can be accomplished by structuring the four cell frequency reuse plan such that no adjacent cells use adjacent channels. As a result, the adjacent channel interference can be minimized, the radio coverage can be extended and in-building penetration can be improved.

BRIEF DESCRIPTION OF THE DRAWINGS

The disclosed inventions will be described with reference to the accompanying drawings, which show important sample embodiments of the invention and which are incorporated hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments.

However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
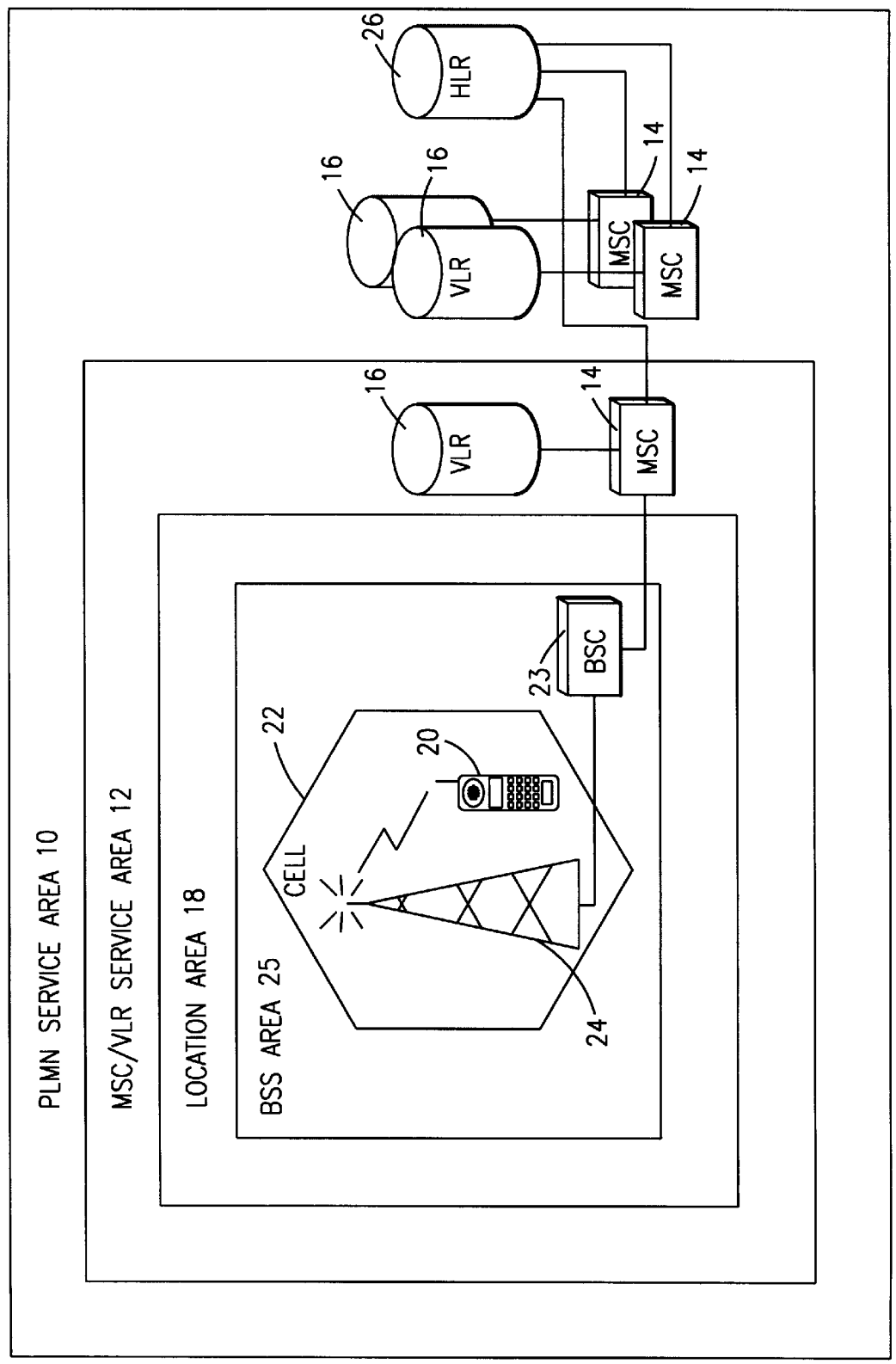
FIG. 1 is a block diagram of a conventional terrestrially-based wireless telecommunications system.
Figure 2:
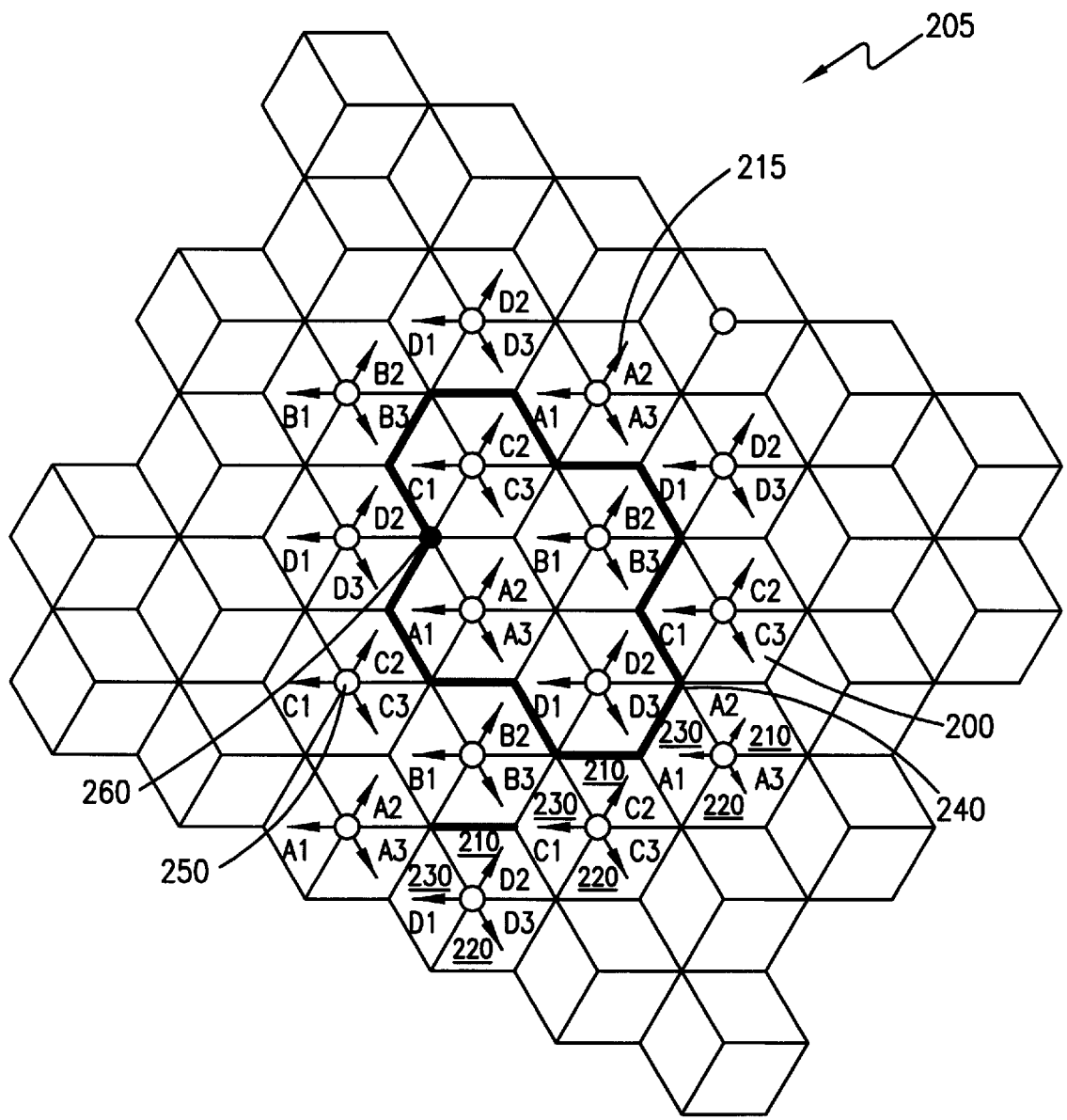
FIG. 2 is an illustration of a conventional frequency re-use plan based upon a four cell, center-excited, three-sector cluster.
Figure 3:
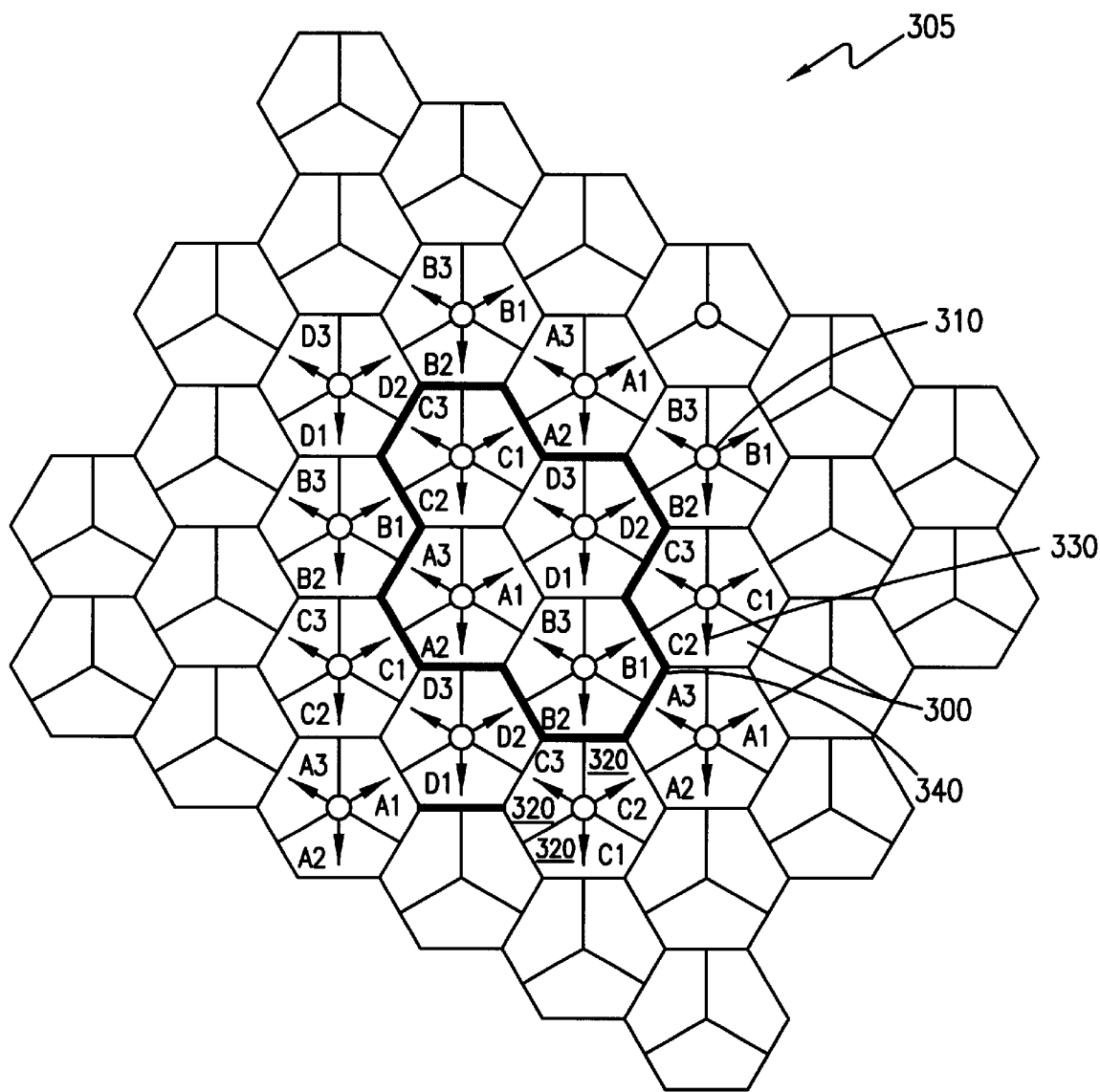
FIG. 3 illustrates a four cell frequency re-use plan with a center-excited three-sector directional pattern in accordance with preferred embodiments of the present invention.

With reference now to FIG. 3 of the drawings, there is illustrated a group of clusters 340 for an N=4 cell planning structure for a center-excited, three-sector directional pattern, where N equals the number of frequency groups (cells 300) within each cluster 340, illustrated by the bold line. The channel frequencies are re-used for each cluster 340 within a cellular network 305. Each cell 300 contains a single antenna site (base station) 310, preferably substantially at the center thereof, with three sectors 320 having antenna pointing azimuths 330 separated by 120 degrees. Each sector 320 is approximated by the shape of a rhombus and utilizes both a transmitting antenna and a corresponding receiving antenna with the same antenna-pointing azimuth 330, represented by an arrow as in FIG. 2.

The center-excited three sector pattern splits the hexagon representing the cell 300 into three rhombi 320 and assigns a frequency group having three sub-groups to each cell 300. Each of the three subgroups of one channel frequency group are assigned to a respective sector 320 of the cell, as shown in FIG. 3 of the drawings. The N=4 frequency plan for the sectorized antenna cell configuration uses 12 frequency groups (four frequencies multiplied by three sectors) having approximately t/12 channels per group, where t equals the total number of available channels in the spectral band. This type of channel assignment is illustrated in Table 2 hereinbelow.

TABLE 2

| | Frequency Channel Group | | | | | | | | | | | |
|---|---|---|---|---|---|---|---|---|---|---|---|---|
| | a1 | b1 | c1 | d1 | a2 | b2 | c2 | d2 | a3 | b3 | c3 | d3 |
| Channel | 1 | 2 | 3 | 4 | 5 | 6 | 7 | 8 | 9 | 10 | 11 | 12 |
| Number | 14 | 13 | 15 | 16 | 17 | 18 | 19 | 20 | 21 | 22 | 23 | 24 |
| | 26 | 25 | 27 | 28 | 29 | 30 | 31 | 32 | 33 | 34 | 35 | 36 |

As can be seen, each frequency group (cell 300) (a, b, c, and d) in the sectorized configuration is divided into three separate sub-groups (sectors 320) (a1, a2, a3; b1, b2, b3; c1, c2, c3, and d1, d2, d3), and frequency assignments from sub-frequency groups are made to each sector 320. This pattern and the frequency assignment scheme associated therewith provides all the basic properties of a conventional re-use pattern, including, but not limited to, repeatability, splitability, and applicability. For example, the conventional four cell reuse plan has been sufficient to provide good co-channel interference protection required by GSM, DCS 1800 and PCS 1900 specifications.

However, in order to reduce the adjacent channel interference between adjacent sectors 320 of adjacent cells 300 in the corners, the antenna pointing azimuths 330 of each sector 320 of each cell 300 have been altered to 60 degrees, 180 degrees and 300 degrees from north, as compared with 30 degrees, 150 degrees and 270 degrees for the corresponding sectors of the conventional four cell frequency reuse plan, illustrated in FIG. 2. In addition, the antenna-pointing azimuths 330 of each sector 320 of each cell 300 are now pointing towards a side 350 of their respective hexagon-shaped cells 300 instead of towards one of the corners of the hexagon-shaped cells 300, as in conventional four cell plans.

As illustrated in Table 2, in comparison with Table 1, channels 13 and 14, and channels 25 and 26 have been swapped in the frequency groups of a1 and b1 in order to avoid the adjacent channels between frequency groups a1 and d3. Therefore, no adjacent cells 300 use adjacent channels in the four cell, three-sectored cell cluster configuration.

As a result, the frequency reuse pattern of the present invention has low adjacent channel interference, extended radio coverage and improved in-building penetration. This improved network performance can be implemented in such cellular networks 205 as the GSM network, the new Personal Communications System (PCS) 1900 network, the DCS 1800 network, the D-AMPS network, and the AMPS network.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for reducing the adjacent channel interference between adjacent ones of a plurality of cells within a frequency reuse plan, said telecommunications system comprising:
   a plurality of cell clusters, each said cell cluster comprising four cells, each of said cells having a substantially hexagon shape and three sectors, each of said sectors having a substantially rhombus shape; and
   a plurality of base stations, each said cell having a respective one of said base stations substantially centrally located therein, each of said base stations having three antenna-pointing azimuths associated therewith, each of said sectors within each of said cells having a respective one of said antenna-pointing azimuths associated therewith, a first one of said antenna-pointing azimuths being points about sixty degrees from north along a north-south axis, a second one of said antenna-pointing azimuths being pointed about one hundred eighty degrees from north along said north-south axis, and a third one of said antenna-pointing azimuths being pointed about three hundred degrees from north along said north-south axis.

2. The telecommunications system of claim 1, wherein said substantially hexagon shape has six sides, each of said antenna-pointing azimuths of each of said base stations being pointed toward respective ones of said sides.

3. The telecommunications system of claim 1, wherein each said base station within each said cell has a transmitting antenna and a receiving antenna for each said sector, the respective said transmitting antenna and receiving antenna in a given one of said sectors being pointed in the direction of said antenna-pointing azimuth of said given sector.

4. The telecommunications system of claim 1, wherein each said cell cluster has a cluster frequency group associated therewith, and each said cell within a given one of said cell clusters has a cell frequency group associated therewith, each said cell frequency group within said given cell cluster being different.

5. The telecommunications system of claim 4, wherein each said cell cluster has the same cluster frequency group.

6. The telecommunications system of claim 5, wherein each said cell frequency group associated with a given one of said cells being divided into at least three sub-frequency groups, each said sector within said given cell having one of said sub-frequency groups associated therewith.

7. The telecommunications system of claim 6, wherein said sub-frequency group associated with a first one of said sectors of said given cell is adjacent to said sub-frequency group associated with a first one of said sectors of a second one of said cells within said given cell cluster.

8. A method for planning a cell cluster layout which reduces the adjacent channel interference between adjacent ones of a plurality of cells within a telecommunications system, each said cell having a respective one of a plurality of base stations substantially centrally located therein, said method comprising the steps of:
   establishing three antenna-pointing azimuths associated with said each base station, four of cells comprising a cell cluster, each of said cells having a substantially hexagon shape and three sectors, each of said sectors having a substantially rhombus shape, each of said sectors within each of said cells having a respective one of said antenna pointing azimuths associated therewith;
   pointing a first one of said antenna-pointing azimuths for each said base station about sixty degrees from north along a north-south axis;
   pointing a second one of said antenna-pointing azimuths for each said base station about one hundred eighty degrees from north along said north-south axis; and
   pointing a third one of said antenna-pointing azimuths for each said base station about three hundred degrees from north along said north-south axis.

9. The method of claim 8, wherein said substantially hexagon shape has six sides, and further comprising, after said step of establishing, the step of:
   pointing each of said antenna-pointing azimuths of each of said base stations toward respective ones of said sides.

10. The method of claim 8, wherein each said base station within each said cell has a transmitting antenna and a receiving antenna for each said sector, the respective said transmitting antenna and receiving antenna in a given one of sectors being pointed in the direction of said antenna-pointing azimuth of said given sector.

11. The method of claim 8, wherein each said cell cluster has a cluster frequency group associated therewith, and each said cell within a given one of said cell clusters has a cell frequency group associated therewith, each said cell frequency group within said given cell cluster being different.

12. The method of claim 11, wherein each said cell cluster has the same cluster frequency group.

13. The method of claim 12, wherein each said cell frequency group associated with a given one of said cells being divided into at least three sub-frequency groups, each said sector within said given cell having one of said sub-frequency groups associated therewith.

14. The method of claim 13, wherein said sub-frequency group associated with a first one of said sectors of said given cell is adjacent to said sub-frequency group associated with a first one of said sectors of a second one of said cells within said given cell cluster.

15. The telecommunications system of claim 7, wherein said sub-frequency group of a third one of said sectors of a fourth one of said cells in said given cell cluster is adjacent to said sub-frequency group of said first sector of said given cell, said third sector of said fourth cell being physically adjacent to said first sector of said given cell.

16. The telecommunications system of claim 15, wherein each said sub-frequency group has a plurality of channels associated therewith, at least one of, but not all of, said plurality of channels associated with said sub-frequency group of said first sector of said given cell being swapped with an adjacent one of said plurality of channels associated with said sub-frequency group of said first sector of said second cell.

17. The method of claim 14, wherein said sub-frequency group of a third one of said sectors of a fourth one of said cells in said given cell cluster is adjacent to said sub-frequency group of said first sector of said given cell, said third sector of said fourth cell being physically adjacent to said first sector of said given cell.

18. The method of claim 14, wherein each said sub-frequency group has a plurality of channels associated therewith, at least one of, but not all of, said plurality of channels associated with said sub-frequency group of said first sector of said given cell being swapped with an adjacent one of said plurality of channels associated with said sub-frequency group of said first sector of said second cell.

* * * * *